US012319251B2

(12) United States Patent
Seto et al.

(10) Patent No.: US 12,319,251 B2
(45) Date of Patent: Jun. 3, 2025

(54) ELECTRIC PARKING BRAKE DEVICE AND ELECTRIC PARKING BRAKE CONTROL METHOD (71) Applicant: Hitachi Astemo, Ltd., Hitachinaka (JP)

(72) Inventors: Shinji Seto, Tokyo (JP); Shunsuke Aritomi, Tokyo (JP); Ryu Kai, Tokyo (JP); Kimio Nishino, Hitachinaka (JP); Daisuke Kojima, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 369 days.

(21) Appl. No.: 17/790,570

(22) PCT Filed: Oct. 22, 2020

(86) PCT No.: PCT/JP2020/039675
§ 371 (c)(1),
(2) Date: Jul. 1, 2022

(87) PCT Pub. No.: WO2021/149315
PCT Pub. Date: Jul. 29, 2021

(65) Prior Publication Data
US 2023/0043134 A1 Feb. 9, 2023

(30) Foreign Application Priority Data
Jan. 21, 2020 (JP) .................. 2020-007373

(51) Int. Cl.
B60T 13/74 (2006.01)
B60T 7/12 (2006.01)
F16D 65/18 (2006.01)

(52) U.S. Cl.
CPC ............... B60T 13/74 (2013.01); B60T 7/12 (2013.01); F16D 65/18 (2013.01)

(58) Field of Classification Search
CPC ............. B60T 13/74; B60T 7/12; F16D 65/18
See application file for complete search history.

(56) References Cited

U.S. PATENT DOCUMENTS

2014/0156141 A1* 6/2014 Yabuguchi .............. B60T 13/74
701/36
2015/0061365 A1* 3/2015 Sakashita .............. B60T 13/588
303/15

(Continued)

FOREIGN PATENT DOCUMENTS

JP 2015-512824 A 4/2015
JP 2015-121203 A 7/2015
JP 2018-118524 A 8/2018

OTHER PUBLICATIONS

International Search Report for Application No. PCT/JP2020/039675, dated Dec. 1, 2020.

(Continued)

Primary Examiner — Nicholas J Lane
(74) Attorney, Agent, or Firm — Volpe Koenig (57) ABSTRACT Provided fire an electric parking brake device and an electric parking brake control method that can apply an appropriate clamping force by accelerating data measurement and by suppressing influence of load fluctuation during idle running. For this end, the electric parking brake device of the present invention includes: a disc rotor; brake pads that are pressed to the disc rotor; an electric motor that imparts a thrust to the brake pads; a current detection unit that detects a motor current of the electric motor; and a brake control device that controls the electric motor 8 based on the motor current. The brake control device controls the electric motor 8 based on a current change amount of an electric current during a period from a point of time that the motor current becomes a peak current to a predetermined point of time.

8 Claims, 9 Drawing Sheets (56) References Cited

U.S. PATENT DOCUMENTS

| | | | | |
|---|---|---|---|---|
| 2015/0066324 A1* | 3/2015 | Baehrle-Miller | ..... | B60T 13/741 |
| | | | | 701/70 |
| 2016/0052496 A1* | 2/2016 | Seto | ...................... | F16D 55/225 |
| | | | | 188/72.1 |
| 2016/0103430 A1* | 4/2016 | Baehrle-Miller | ..... | F16D 55/226 |
| | | | | 188/162 |
| 2018/0118177 A1* | 5/2018 | No | ............................. | H02P 7/03 |
| 2019/0257378 A1* | 8/2019 | Masuda | ................ | F16D 65/183 |
| 2021/0380089 A1* | 12/2021 | Dossi | ...................... | B60T 7/107 |
| 2023/0126047 A1* | 4/2023 | Kojima | ................... | H02P 29/60 |
| | | | | 318/473 |
| 2023/0227017 A1* | 7/2023 | Aritomi | ................ | H02P 29/032 |
| | | | | 303/20 |

OTHER PUBLICATIONS

Japanese Office Action issued on Feb. 14, 2023 for Japanese Patent Application No. 2020-007373.
International Preliminary Report on Patentability issued on Jul. 26, 2022 for PCT International Application No. PCT/JP2020/039675.

* cited by examiner

ELECTRIC PARKING BRAKE DEVICE AND ELECTRIC PARKING BRAKE CONTROL METHOD

TECHNICAL FIELD

The present invention relates to an electric parking brake device and an electric parking brake control method that are applicable to a vehicle such as an automobile.

BACKGROUND ART

As a brake device, there has been proposed an electric brake that performs braking by pressing a pressing member such as a brake shoe or a drum shoe to a rotary member such as a brake disc or a brake drum by the rotation of a motor. In using the electric brake, with respect to a required braking force, there exists a demand that it is desirable to prevent the required braking force from becoming an excessive braking force as much as possible.

In an attempt to satisfy such a demand, there has been proposed a technique described in patent literature 1, for example, Patent literature 1 describes "in a method where a clamping force is determined as a function of a motor constant of a brake motor, and the motor constant is calculated based on a latest measured value of a motor current (10, 1A) measured during an operation of the brake motor, to determine the motor constant (KM), an idle running voltage (UsO) and an idle running current (IO) in the brake motor during an idle running stage are measured, and the motor current (IA) is calculated during a dynamic current change stage".

CITATION LIST

Patent Literature

[Patent literature 1] Japanese Translation of PCT International Application Publication No. 2015-512824

SUMMARY OF INVENTION

Technical Problem

However, in the technique described in Patent Literature 1, the measurement of data such as a current and a voltage for a long time from a current change stage to an idle running stage is necessary. Accordingly, there is a possibility that the data measurement is influenced by load fluctuation during idle running, and there is also a possibility that complicated calculation becomes necessary.

It is an object of the present invention to provide an electric parking brake device and an electric parking brake control method where an appropriate clamping force can be obtained by accelerating data measurement and by suppressing influence of load fluctuation during idle running.

Solution to Problem

To achieve the above-mentioned object, the present invention provides an electric parking brake device that includes: a rotary member; a pressing member that is configured to be pressed to the rotary member; an electric motor configured to impart a thrust to the pressing member; a current detection unit configured to detect a motor current of the electric motor; and a brake control device configured to control the electric motor based on the motor current, wherein the brake control device is configured to control the electric motor based on a current change amount of an electric current from a point of time that the motor current becomes a peak current to a predetermined point of time.

The present invention also provides an electric parking brake device that includes: a rotary member; a pressing member that is configured to be pressed to the rotary member; an electric motor configured to impart a thrust to the pressing member; a current detection unit configured to detect a motor current of the electric motor; and a brake control device configured to control the electric motor based on the motor current, wherein the electric parking brake device includes a low pass filter configured to remove noise of the motor current, and the brake control device is configured to control the electric motor based on an LPF current change amount during a predetermined period including a point of time at which a gradient of the LPF current becomes maximum after a point of time of a peak current of the LPF current that passes through the low pass filter.

The present invention further provides an electric, parking brake control method configured to control an electric motor by detecting a motor current of the electric motor that imparts a thrust to a brake pad, wherein the electric motor is controlled based on a current change amount of an electric current from a point of time that the motor current becomes a peak current to a predetermined point of time.

Still further, the present invention further provides an electric parking brake control method configured to control an electric motor by detecting a motor current of the electric motor that imparts a thrust to a brake pad, wherein a low pass filter configured to remove noise of the motor current is provided, and the electric motor is configured to be controlled based on an LPF current change amount during a predetermined period counted from a point of time that an LPF current that has passed through the low pass filter becomes a peak current and including a point of time that a gradient of the LPF current becomes maximum.

Advantageous Effects of Invention

According to the present invention, it is possible to provide an electric parking brake device and an electric parking brake control method where an appropriate clamping force that is not excessively large can be obtained with a simple system by calculating a current change amount in a first gradient zone after a peak current.

DESCRIPTION OF EMBODIMENT

Hereinafter, embodiments of an electric parking brake device according to the present invention are described with reference to drawings.

It must be noted that the present invention is not limited by embodiments described hereinafter, and also includes various modifications and applications within the scope of the technical concept of the present invention.

Embodiment 1

Figure 1:
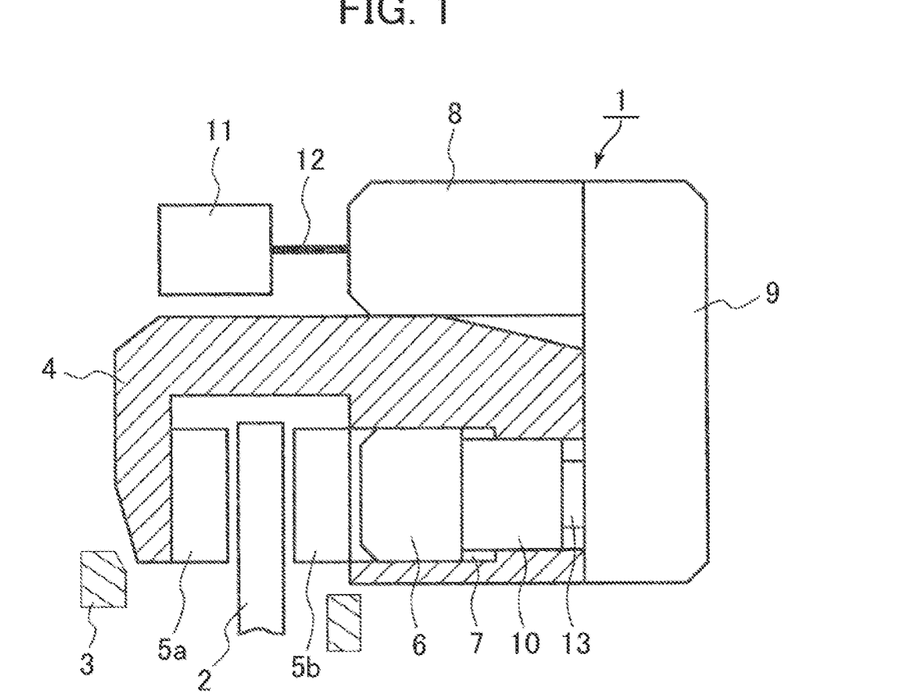
FIG. 1 is a cross-sectional view illustrating a configuration of a brake caliper of an electric parking brake device according to an embodiment of the present invention.

First, an embodiment 1 of a brake device according to the present invention is described with reference to FIG. 1 to FIG. 12. FIG. 1 is a constitutional view illustrating one example of the brake device to which the present invention is applied, and FIG. 2 is a view illustrating the configurational example of a vehicle that includes the brake device.

Figure 2:
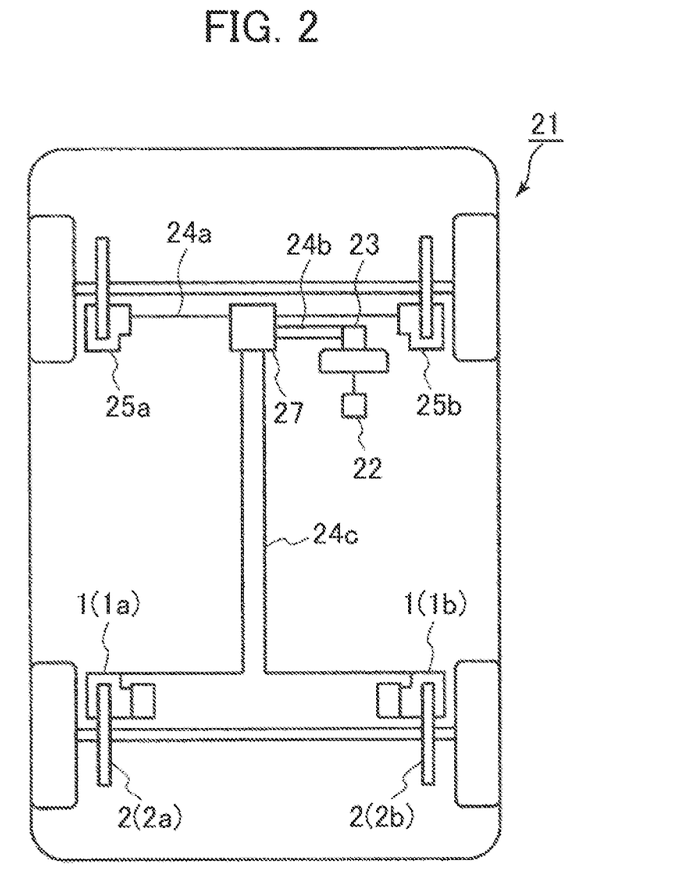
FIG. 2 is an overall configurational view of the electric parking brake device according to the embodiment of the present invention.

As illustrated in FIG. 2, the brake device 1 according to present embodiment is formed of rear wheel disc brake devices 1a, 1b (the rear wheel disc brake devices 1a, 1b having the same configuration). The rear wheel disc brake devices 1a, 1b are disposed at left and right rear wheel portions of a vehicle 21. The rear wheel disc brake device also functions as a parking brake used at the time of parking. In this embodiment, each of the rear wheel disc brake devices 1a, 1b forms an electric parking brake device that includes an electric motor.

The vehicle 21 includes; a brake pedal 22 that is operated by a driver; a master cylinder 23 that generates a pressure by moving a piston disposed in the master cylinder 23 in response to an operation of the brake pedal 22; pipes 24a, 24b, 24c that transmit a pressure; and front wheel disc brake devices 25a, 25b (the front wheel disc brake devices 25a, 25b having the same configuration). A liquid pressure control device 27 that performs the prevention of lateral sliding and the like by controlling a liquid pressure is disposed between the master cylinder 23 and the pipes 24a, 24b, 24c connected to respective wheels.

As illustrated in FIG. 1, the brake device 1 (the brake devices 1a, 1b having the same configuration and hence, a, b are omitted hereinafter) that is disposed on the rear wheel includes: a cylinder that is supported on a carrier 3, that is fixed to a non-rotary portion of the vehicle 21 that is positioned on more vehicle 21 inner side than a disc rotor 2 (rotary member) in a state where the cylinder 4 is floatable in an axial direction of the disc rotor 2 (2a, 2b); brake pads 5, 5b (pressing members) that are disposed on both sides of the disc rotor 2; a piston 6 that is slidable in the cylinder 4; a pressure chamber 7; an electric motor 8 that drives the piston 6, and the like. The electric motor 8 imparts a thrust to the brake pads 5a, 5b by way of the piston 6.

An output shaft of the electric motor 8 is connected to a speed reduction device 9, and an output shaft of the speed reduction device 9 is connected to a rotation, straight movement converting mechanism 10. With such a configuration, the piston 6 is movable in a straight movement direction by the rotation/straight movement converting mechanism 10. The electric motor 8 is connected to a brake control device 11 (controller) by an electric line 12. The pressure chamber 7 is connected with the pipe 24. A rotation control of the electric motor 8 is performed by the brake control device 11.

Figure 3:
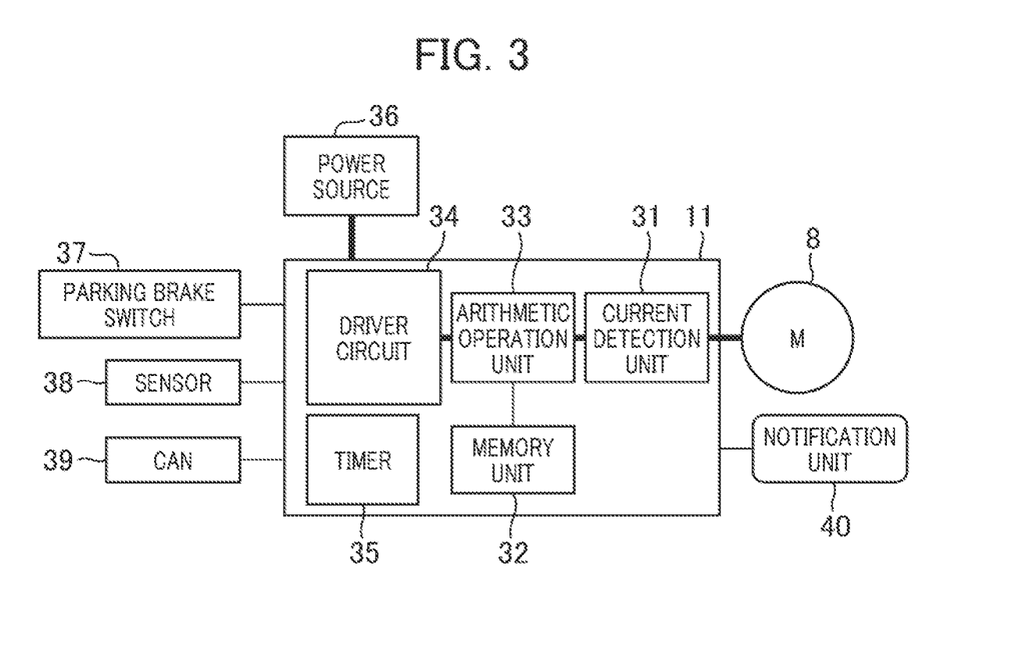
FIG. 3 is a control block diagram of the electric parking brake device according to the embodiment of the present invention.

Next, the configuration of the brake control device 11 is described. FIG. 3 is a control block diagram of the electric parking brake device.

The brake control device 11 is operated by being connected to a power source 36 such as a battery. The brake control device 11 includes: a current detection unit 31 that detects a current at the time of driving the electric motor 8; an arithmetic operation unit 33 that calculates a controlled variable of the electric motor 8 based on a detection value of the current detection unit 31, a control program stored in a memory unit 32 in advance and the like; a driver circuit 34 that receives the result of the calculation performed by the arithmetic operation unit 33, and outputs a control signal to the electric motor 8; and a timer 35 that counts a time.

The brake control device 11 is connected to: a parking brake switch 37 that is operated by a driver; various sensors 38 that detect acceleration, a vehicle speed and the like; and a CAN 39 provided for acquiring information on respective units of the vehicle 21. The brake control device 11 controls the supply of a power source to the electric motor 8 in response to various signals. When necessary, a notification unit 40 such as a warning lamp is connected to the brake control device 11. The sensors 38 include a power source sensor that detects a power source, and a voltage sensor (voltage detection unit) that detects a voltage of the motor.

Figure 4:
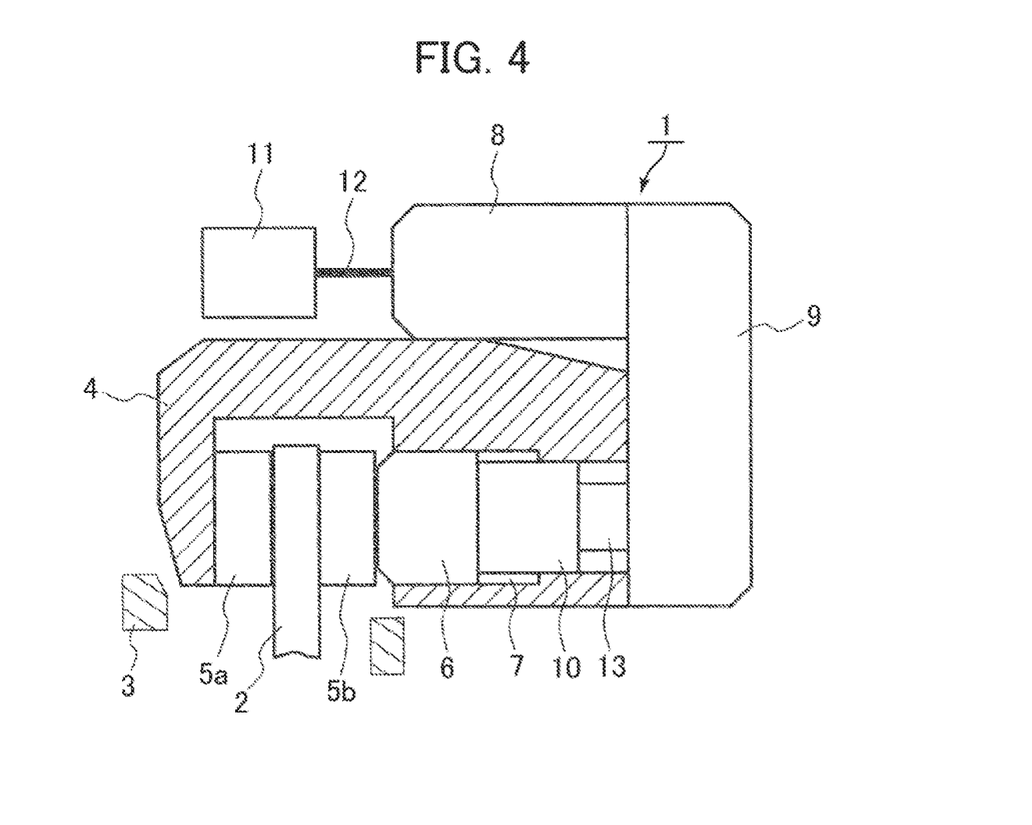
FIG. 4 is a cross-sectional view illustrating the configuration of the brake caliper of the electric parking brake device according to the embodiment of the present invention.

Next, an operation of the brake device 1 is described. FIG. 4 is a cross-sectional view that illustrates the configuration of a brake caliper of the electric parking brake device according to the embodiment of the present invention (at the time of clamping).

First, the operation of the brake device 1 is described with respect to a case where the brake device 1 is used as a normal-use brake. When a driver operates the brake pedal 22 (FIG. 2), a liquid pressure is generated by the master cylinder 23, and the liquid pressure is transmitted to the pressure chamber 7 through the pipe 24. The piston 6 is advanced due to the liquid pressure transmitted to the pressure chamber 7, and the brake pads 5a, 5b are pressed to the disc rotor 2 so that a braking force is generated. Further, in the brake device equipped with the liquid pressure control device 27 and the like, irrespective or an operation of the brake pedal 22 by the driver, a required liquid pressure can be generated by the liquid pressure control device 27 and, in the same manner, a braking force is generated by the generated liquid pressure.

Next, an operation of the parking brake is described. A braking force is generated based on an apply command 41 for generation of a thrust from the brake control device 11*a* by a switch-on operation of the parking brake switch 37 operated by a driver or the detection of a vehicle state or the like (see FIG. 6). When the electric motor 8 is driven based on the apply command 41, a drive force of the electric motor 8 is transmitted to the piston 6 by way of the speed reduction device 9, the rotation/straight movement converting mechanism 10 and the like, and a thrust is generated on the piston 6. When the thrust is generated on the piston 6, as illustrated in FIG. 4, the piston 6 is brought into contact with the brake pad 5*b*. Further, a force is generated in the cylinder 4 in a direction that the brake pad 5*a* is pressed to the disc rotor 2, and a braking force is generated on the disc rotor 2 in a state where the disc rotor 2 is sandwiched between the brake pads 5*a*, 5*b*. Then, when the braking force reaches a required braking force, the brake control device 11 stops the driving of the electric motor 8.

Figure 5:
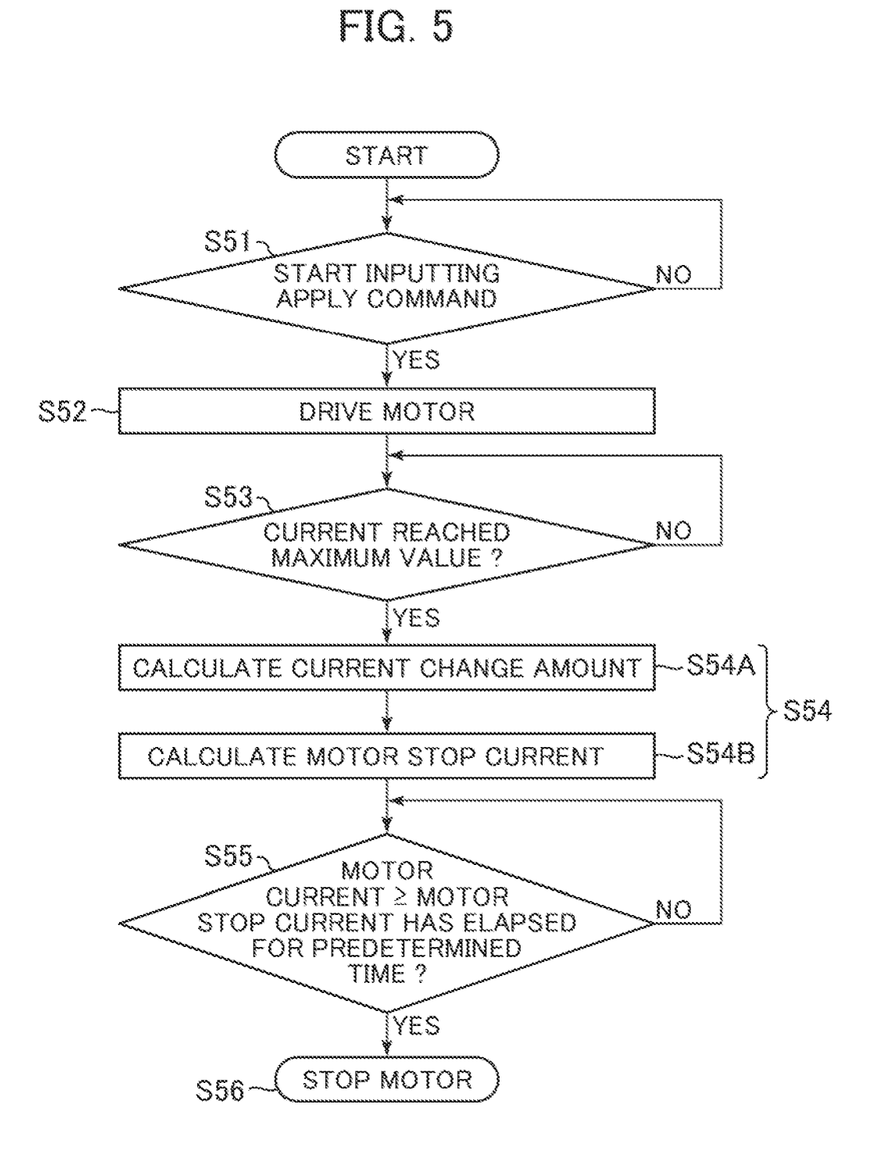
FIG. 5 is a flowchart for describing an operation of a brake control device of the electric parking brake device according to the embodiment of the present invention.

An operation at this stage is described with reference to a flowchart. FIG. 5 is the flowchart for describing the operation of the brake control device according to the embodiment of the present invention.

In step S51, whether or not an apply command is inputted is determined. When the apply command is inputted (Yes in step S51), the processing advances to step S52 and the electric motor 8 is driven. When the apply command is not inputted (No in step S51), the processing in step S51 is repeated.

When the electric motor 8 is driven, whether or not a motor current reaches a maximum value is determined in step S53. When the motor current reaches the maximum value (a peak current) (Yes in step S53), the processing advances to step S54A. When the motor current does not reach the maximum value (No in step S53), the processing in step S53 is repeated.

When the motor current reaches the maximum value, a current change amount is calculated in step S54A, and after the calculation, a motor stop current is calculated in step S54B. Step S54A and step S54B form step S54 of performing the calculation of the motor stop current.

Next, in step S55, the motor stop current calculation described later is performed so that whether or not a motor current has exceeded the motor stop current calculated in step S54 is determined. When the motor current has exceeded the motor stop current, or when a predetermined time has elapsed after the motor current has exceeded the motor stop current (Yes in step S55), the processing advances to step S56, and the electric motor is stopped. When the motor current has not exceeded the motor stop current or when the predetermined time has not elapsed after the motor current has exceeded the motor stop current (No in step S55), the processing in step S55 is repeated.

Figure 6:
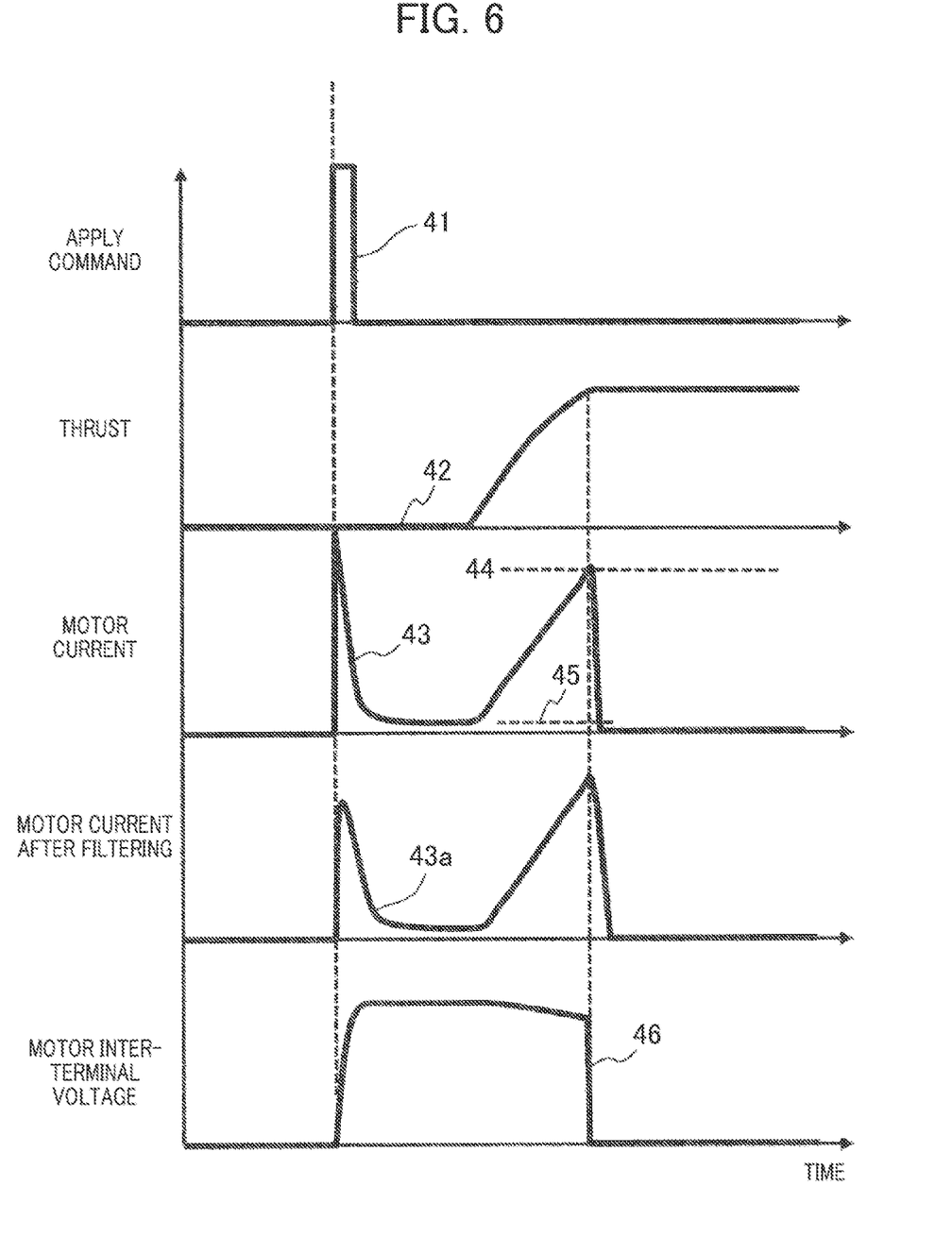
FIG. 6 is a graph illustrating time waveforms of an apply command, a thrust, a motor current, a motor current after filtering, and an inter-terminal voltage.

Next, the description is made with respect to the operation of the brake device 1 using time waveforms. FIG. 6 is a graph illustrating the time waveforms of an apply command, a thrust, a motor current, the motor current otter filtering, and an inter-terminal voltage. In FIG. 6, in a descending order from the top, the waveforms of the apply command 41, the thrust 42, the motor current the motor current after the current passes through a low pass filter described later (LPF current 43*a*), and the motor inter-terminal voltage 46 are described.

In FIG. 6, when the apply command 41 is inputted, the electric motor 8 is driven so that the piston 6 is moved in the direction that the piston approaches the brake pad 5*b*. Then, the piston 6 performs idle running until the piston 6 is brought into contact with the brake pad 5*b*. At this stage of operation, a load applied to the electric motor 8 is small and hence, the motor current 43 maintains an approximately fixed low value (an idle running current 45). With respect to the motor current 43, an inrush current flows immediately after starting the driving of the electric motor 8 and, then, the motor current 43 is covered current that flows during a period from a point of time that the motor current 43 is converged to a point of time that the piston 6 is brought into contact with the brake pad 5*b* becomes the idle running current 45.

Then, when the piston 6 and the brake pad 5*b* are brought into contact with each other, the thrust 42 of the piston 6 increases, and a pressing force that the brake pad 5*b* presses the disc rotor 2 is started to increase along with the increase of the thrust 42. When the pressing force to the disc rotor 2 increases, a load to the electric motor 8 gradually increases, and the motor currant 43 increases along with the increase of the load. Then, when the motor current 43 has exceeded the motor stop current 44, the electric motor 8 is stopped. Alternatively, a current detected by a sensor is corrected at every sampling time and hence, the electric motor 8 may be stopped when the motor current 43 has exceeded the motor stop current 44 a predetermined number of times (for example, three times).

Next, the manner of determining the motor stop current 44 (step S54) is described. Step S54 of calculating the motor stop current 44 includes: step S54A of calculating a current change amount after the in rush current; and step S54B of calculating the motor stop current 44 based on this current change amount, and a map or a calculation equation which are obtained in advance based on a voltage. The map and calculation equation are stored in the memory unit 32 of the brake control device 11.

The method of obtaining the motor stop current 44 is described. First, the equation of motion of the electric parking brake device is expressed by the following equation.

[Equation 1]

$$K_t I(t) = K F_{CLP} + J \frac{d\omega(t)}{dt} + T_{fric} + \lambda \omega(t) \qquad (1)$$

In the above equation (1), Jdω/dt is an inertia term, J is a coefficient of inertia, Kt is a torque constant, I is a current, η is a coefficient of viscosity, ω is a rotational speed, Tfrc is a collective friction torque from the electric motor 8 to the rotation/straight movement converting mechanism 10 of the power transmission mechanism, and FCLP is a pressing force. K corresponds to a coefficient of rotation/straight movement conversion of the rotation/straight movement converting mechanism 10.

By modifying the equation (1), a current when the pressing force becomes FCLP can be calculated.

[Equation 2]

$$I(t) = \frac{1}{K_T}\left(KF_{CLP} + J\frac{d\omega(t)}{dt} + T_{fric} + \lambda\omega(t)\right) \quad (2)$$

Accordingly, assuming that the pressing force to be held is FCLP, by stopping the electric motor 8 at the current value I obtained by the equation (2), the pressing force becomes FCLP. Accordingly, this value is set as the motor stop current Icut.

However, in setting his value, the values of the respective parameters in the equation (2) (for example, a coefficient of rotation/straight movement conversion K, the torque constant Kt, a coefficient of viscosity λ, the rotational speed ω) become necessary. The value depending on irregularities of respective individuals and an environment such as a temperature or a voltage and hence, it is difficult to accurately calculate the values for the respective operations.

Accordingly, by taking into account an environment and irregularities in the individuals in determining the respective parameters, even under a condition where it is difficult to obtain a thrust because of low mechanical efficiency or low motor performance, it is possible to set a motor stop current that can surely generate a required pressing force (for example, a pressing force required for stopping an automobile on a slope) as a constant. However, in such a case, a thrust more then necessary is generated depending on an individual that has a favorable mechanical efficiency or a favorable motor characteristic. Accordingly, an excessive stress is applied to a mechanism system of the electric parking brake device and hence, a manufacturing cost is pushed up because of the necessity of using a mechanism system having a high strength or the like. Accordingly, it is necessary to suppress irregularities so as to prevent the increase of a holding thrust while ensuring a lowest guaranteed thrust. By taking into account the above, a method of setting a motor stop current is described hereinafter.

Figure 7:
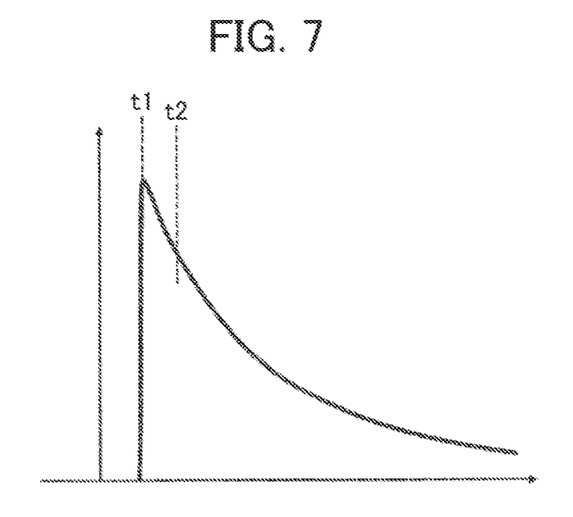
FIG. 7 is an enlarged view of a current waveform of the motor current immediately after starting inputting of the apply command in FIG. 4.

FIG. 7 is an enlarged view of a current waveform of a motor current immediately after inputting of the apply command illustrated in FIG. 6 is started. This current waveform is a waveform determined in accordance with an equation of an electric circuit and an equation of motion.

The equation of the electric circuit is expressed by the following equation.

[Equation 3]

$$V = RI(t) + L\frac{dI(t)}{dt} + \omega(t)K_t \quad (3)$$

In the equation, R is an electric resistance and L is an inductance. Further, with respect to the equation of motion, FCLP is 0 (FCLP=0) before the pressing force increases in the equation (1) and hence, this term can be ignored. Accordingly, the equation of motion is expressed by the following equation.

[Equation 4]

$$K_t I(t) = J\frac{d\omega(t)}{dt} + T_{fric} + \lambda\omega(t) \quad (4)$$

It is difficult to strictly solve these two equations. However, in the third term in the equation (3), LdI/dt is the term that rapidly decreases within several ms and hence, this term can be ignored. Further, it is assumed that the rate of the friction term is small with respect to the total rate. Accordingly, these two equations can be solved by the following equation by approximation.

[Equation 5]

$$\frac{I(t)}{V} = \frac{K_t^2}{RK_t^2 + R^2\lambda}\exp\left(-\frac{K_t^2 + R\lambda}{JR}t\right) + \frac{\lambda}{K_t^2 + R\lambda} \quad (5)$$

By differentiating this equation and by setting the time to 0, the following equation is obtained. The left term in the following equation is a current change amount/voltage.

[Equation 6]

$$\frac{dI(t)/dt}{V} = -\frac{Kt^2}{JR^2} \quad (6)$$

In general, the lower a temperature, the larger a torque constant Kt becomes, and the lower a temperature, the smaller an electric resistance R becomes. Accordingly, the lower a temperature, the larger an absolute value of a gradient of a current becomes.

On the other hand, a required current obtained by the equation (2) mainly changes based on a torque, constant or a coefficient of viscosity that changes based on a temperature change. In such a situation, when a temperature is low, a motor torque constant increases and hence, a required current can be reduced. On the other hand, because of influence, of grease or the like, the lower a temperature, the larger a viscous resistance λ becomes and hence, required current increases. To express the relationship between a temperature and a required current based on this equation, the relationship illustrated is FIG. 8 is obtained.

Figure 8:
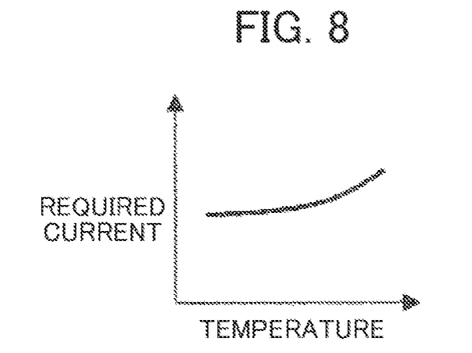
FIG. 8 is a graph illustrating the relationship between a temperature and a required current.
Figure 9:
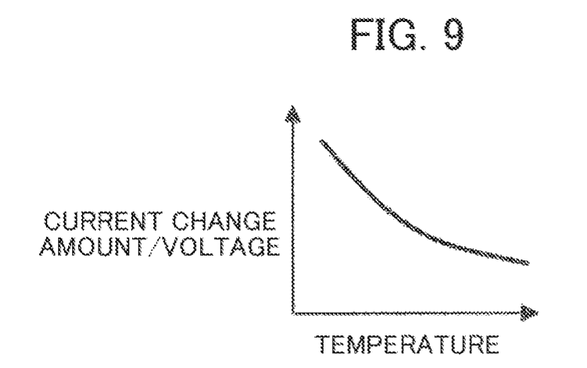
FIG. 9 is a graph illustrating the relationship between a temperature and a current change amount/voltage.

FIG. 8 is a graph illustrating the relationship between a temperature and a required current. In FIG. 8, basically, the lower the temperature, the smaller the required current becomes. However, at a low temperature, because of influence of viscosity, the degree of lowering of the required current becomes gentle. FIG. 9 is the graph illustrating the relationship between a temperature and a current change amount/voltage. With the use of the relationship illustrated in FIG. 8 and the relationship illustrated in FIG. 9, the required current can be changed by acquiring the current change amount/voltage so that the electric motor can be stopped with a necessary and sufficient current.

Accordingly, to acquire an absolute value of this gradient of current, an absolute value of a change amount corresponding to differentiation (hereinafter current change amount) is acquired by acquiring a change portion between a current at a peak current time (point of time t1 in FIG. 7) and a current after a lapse of a predetermined time (point of time t2) (step S54A). In this embodiment, a predetermined time (point of time t2) is set before a point of time that the idle running current 45 at which the motor current becomes approximately constant is detected. The times is measured by the timer 35.

Figure 10:
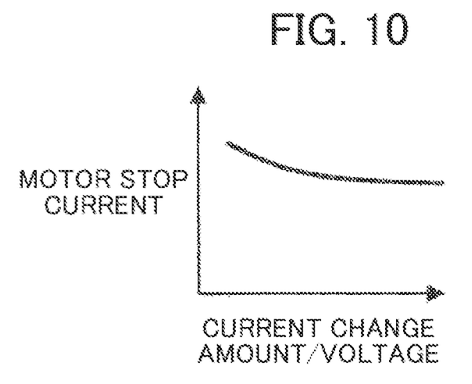
FIG. 10 is a graph illustrating the relationship between a current change amount/voltage and a motor stop current.

To study the relationship between the value obtained by dividing a current change amount by a voltage in the equation (6) and a temperature, the relationship illustrated in FIG. 9 is obtained. As illustrated in FIG. 9, the lower the temperature, the value obtained by dividing a current change amount by a voltage is increased. In this embodiment, the relationship illustrated in FIG. 10 is derived from the relationship illustrated in FIG. 8 and the relationship illustrated in FIG. 9. FIG. 10 is a graph illustrating the relationship between a current change amount/voltage and a motor stop current. In FIG. 8 and FIG. 9, a temperature is taken on an axis of abscissas. Based on this relationship, in a region where a temperature is low, a required current becomes small and, reversely, a current change amount/voltage is increased. In addition, in a region where a temperature is high, a required current becomes large and, reversely, a current change amount/voltage is decreased. FIG. 10 illustrates the relationship between a stop current and a current change amount/voltage based on the relationship illustrated in FIG. 8 and the relationship illustrated in FIG. 9 while substituting a required current with a stop current.

The relationship between a value obtained by dividing a current change amount by a voltage and a motor stop current can be derived as illustrated in FIG. 10. A current change amount obtained in step S54A is divided by a voltage, the relationship illustrated in FIG. 10 is stored in the memory unit 32 as a map in advance, and a motor stop current is calculated (step S54B). This relationship may be calculated based on an equation, or may be calculated by an experiment. This embodiment is characterized in that a thrust of the brake pad is controlled based on a current change amount front a point of time t1 of a peak current to a point of time t2 that a predetermined period has elapsed from the point of time t1 of the peak current.

In FIG. 10, in response to the relationship that the lower a temperature, the gentler the gradient of a change in a required current becomes as illustrated in FIG. 8, the relationship is established where the higher a current change amount/voltage, the gentler a motor stop current changes. This characteristic is acquired based on the relationship between an actual temperature and a generated thrust (required current). Accordingly, the characteristic is not always a monotonous decrease and, for example, becomes a relationship that protrudes downward in a case where viscosity is increased at a low temperature.

Figure 11:
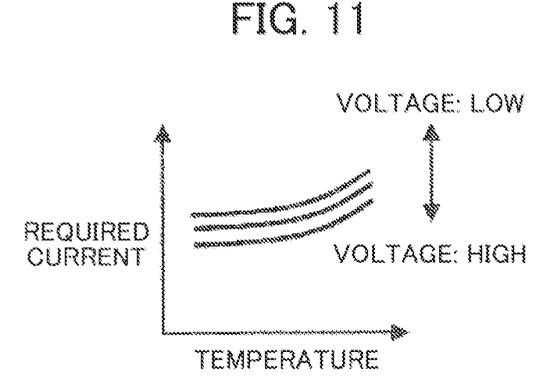
FIG. 11 is a graph illustrating the relationship between a temperature and a required current for each voltage.

In FIG. 8, influence of a voltage is not described. However, there may be a case where the inertia term or the like is changed based on the voltage such that the higher the voltage, the larger a pressing force is liable to become. In consideration of such influence, the relationship may be taken where a required current changes for every voltage with respect to a temperature. That is, as illustrated in FIG. 11, the relationship between a temperature and a required current is determined for every voltage. FIG. 11 is a graph illustrating the relationship between a temperature and a required current for every voltage.

Figure 12:
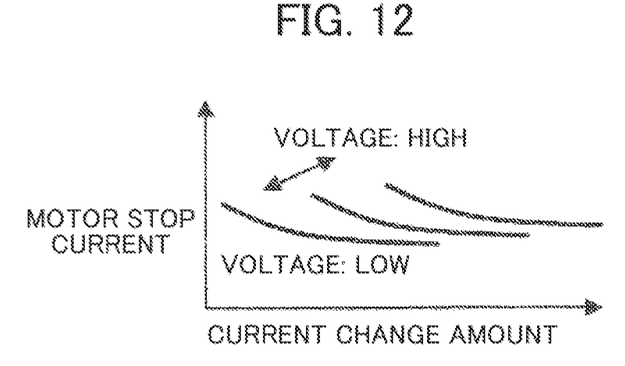
FIG. 12 is a graph illustrating the relationship between a current change amount and a required current for each voltage.

Based on the relationship illustrated in FIG. 11 and the relationship illustrated in FIG. 9, it is also possible to obtain the relationship between a current change amount and a motor stop current corresponding to the current change amount for every voltage as illustrated in FIG. 12.

FIG. 12 is a graph illustrating the relationship between a current change amount and a required current for every voltage. The relationship illustrated in FIG. 12 may be mapped and is stored in the memory unit 32 as a map, and a required motor stop current may be changed corresponding to measured current change amount and voltage.

In the above-mentioned embodiment, the acquisition of a current change amount (step S54A) is performed such that the current change amount is directly obtained from immediately after a point of time that the motor current becomes a peak current. However, for example, in the case of a brushed electric motor, a measured motor current is a current on which oscillations are superposed due to influence such as a change in a contact state between a brush and a commutator. In this case, there may be a case where a more advantageous effect can be obtained by making use of a motor current from which oscillations (noises) are eliminated by making the motor current pass through a filter.

Figure 13:
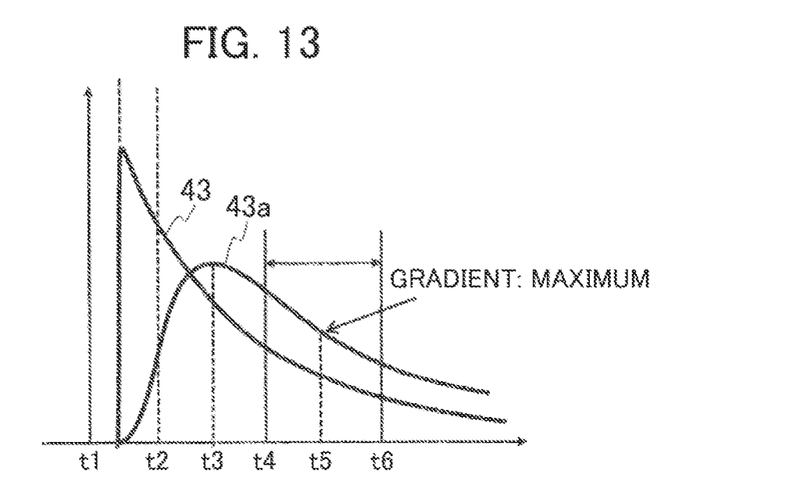
FIG. 13 is a graph illustrating a current waveform of a motor current immediately after starting inputting of the apply command, and the current waveform of the motor current after the motor current is made to pass through a low pass filter.

FIG. 13 is a graph illustrating a current waveform of a motor current immediately after starting inputting of an apply command, and a current waveforms of the motor current after the motor current is made to pass through the low-pass filter. In FIG. 13, in the current waveform of the motor current 43, the current rapidly rises, reaches a peak current at a point of time t1 and, thereafter, the current is lowered.

A point of time t3 at which a motor current (LPF current 43a) that has passed through the low-pass filter (LPF) becomes a peak current is delayed immediately after starting a motor operation and hence, a current change amount is detected after the point of time t3.

An absolute value of a gradient of the LPF current 43a exhibits a tendency where the absolute value becomes zero (0) at the point of time t3 at which the LPF current 43a becomes a peak current and, thereafter, the absolute value becomes maximum after a lapse of a certain time (a point of time t5 in the drawing) and, then, the absolute value becomes small. Accordingly, it is desirable to acquire a change amount including a portion (a first period) in which the gradient becomes maximum after the point of time that the LPF current 43a becomes the peak current. In this embodiment, a period between a point or time t4 before the point of rime t5 at which the gradient becomes maximum and a subsequent point of time t6 is set as the first period. In a period after the point of time t6, the gradient becomes smaller than the gradient in the first period, and this period is set as a second period. In this embodiment, the electric motor 8 is controlled based on a LPF current change amount during a predetermined period (from the point of time t4 to the point of time t6) that comes after the point of time that the LPF current 43a that has passed through the low-pass filter has become a peak current and includes the point of time t5 at which the gradient of the LPF current 43a becomes maximum.

In calculating the LPF current change amount, the LPF current change amount may be calculated regressively using a least-square method or the like based on values at a plurality of points. With such calculation, influence of an error can be reduced.

Figure 14:
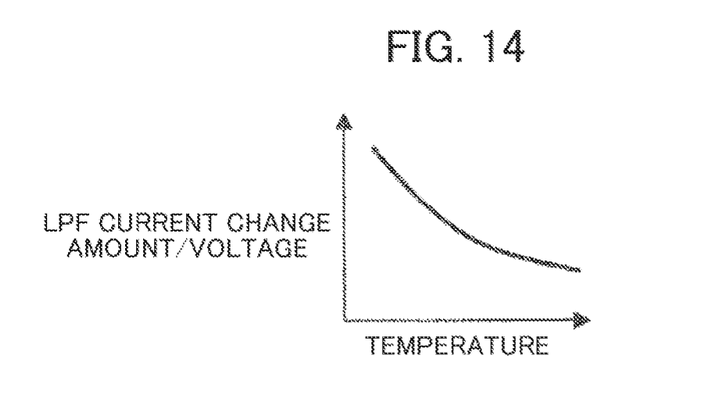
FIG. 14 is a graph illustrating the relationship between a temperature and an LPA current change amount/voltage.

Even when an absolute value of a change amount of the LPF current 43a is used as described above, the tendency illustrated in FIG. 9 does not change, and the tendency illustrated in FIG. 14 is obtained. FIG. 14 is a graph illustrating the relationship between a temperature and an LPF current change amount/voltage.

The brake control device 11 according to the present embodiment calculates a motor stop current of the electric motor 8 based on a value obtained by dividing an LPF current change amount by a voltage of the electric motor 8 (LPF current change amount/voltage). Then, in the same manner as step S55 in FIG. 5, when an LPF current has exceeded a motor stop current, or when a predetermined time has elapsed after the LPF current has exceeded the motor stop current, the electric motor is stopped.

In this manner, according to the present embodiment, a thrust of the brake pad is controlled using the change amount of the LPF current 43a and hence, a motor stop current can be acquired by making the difference in a change amount due to a temperature more apparent and by reducing influence of noise. In case of a brushed electric motor, a cutoff frequency of the low pass filter may preferably be set, by taking into account an oscillation frequency determined based on a motor rotational speed, the number of brushes, the number of commutators and the like and an aliasing frequency that takes into account a sampling cycle of the oscillation frequency, to a value below the oscillation frequency and the aliasing frequency. The motor rotational speed is gradually increased from velocity zero (0) at the time of starting the motor and hence, the rotational speed immediately after starting the motor is low, whereby oscillations cannot be eliminated by the LPF. Accordingly, a motor stop current may be set such that an oscillation frequency that is generated in a change amount acquired portion of an LPF current is eliminated.

As has been described above, according to the present embodiment, a motor stop current is set based on a change amount of a motor current or an LPF current. Accordingly, irregularities in a generated pressing force that change depending on a temperature can be reduced and hence, it is possible to provide an electric parking brake device and an electric parking brake control method at a low cost. The above-described processing is not limited to the case where irregularities in a generated pressing force that change depending on the temperature, and the reduction of irregularities in pressing force can be realized based on the above-mentioned relationship even when a torque constant changes.

Embodiment 2

Figure 15:
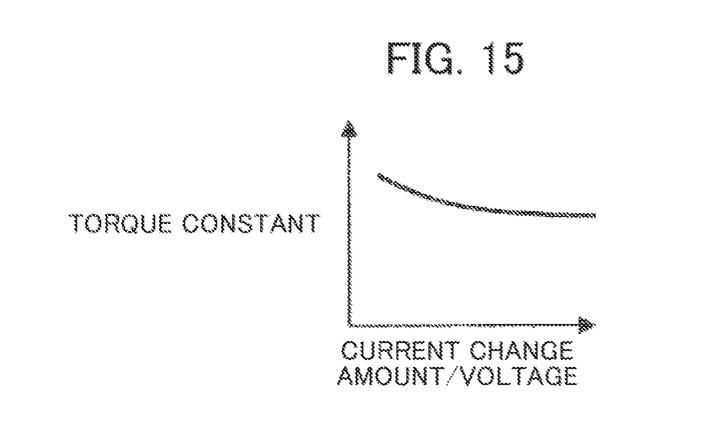
FIG. 15 is a graph illustrating the relationship between a torque constant and a current change amount/voltage according to an embodiment 2 of the present invention.
Figure 16:
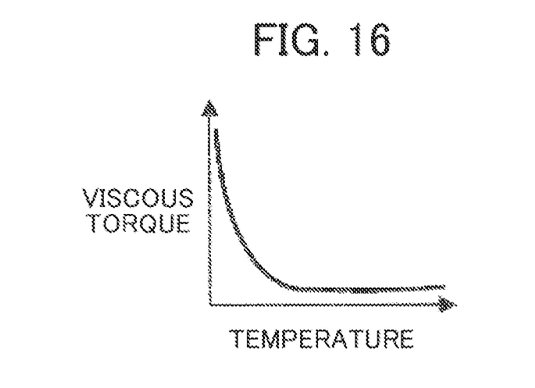
FIG. 16 is a graph illustrating the relationship between a temperature and a viscous torque according to the embodiment 2 of the present invention.
Figure 17:
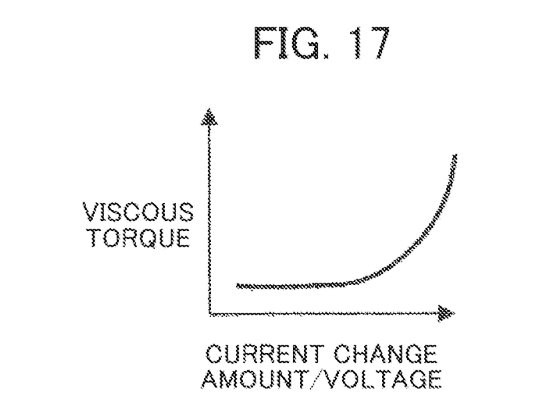
FIG. 17 is a graph illustrating the relationship between a current change amount/voltage and a viscous torque according to the embodiment 2 of the present invention.

Next, an embodiment 2 according to the present invention is described with reference to FIG. 15 to FIG. 17. FIG. 15 is a graph illustrating the relationship between a torque constant and a current change amount/voltage according to the embodiment 2 of the present invention. FIG. 16 is a graph illustrating the relationship between temperature and a viscous torque according to the embodiment 2 of the present invention. FIG. 17 is a graph illustrating the relationship between a current change amount/voltage and a viscous torque according to the embodiment 2 of the present invention. In the embodiment 1, a motor stop current is directly acquired based on a value obtained by dividing a current change amount by a voltage. However, in this embodiment, a method is proposed where a torque constant and viscosity are separately estimated based on a value obtained by dividing a current change amount by a voltage.

A change amount of a current is based on the equation (6) as described above and hence, the relationship between a torque constant and a current change amount/voltage is expressed by a graph illustrated in FIG. 15. In a region where, a current change amount/voltage is small, a torque constant is high and hence, along with the increase of the current change amount/voltage, a torque constant is gradually decreed. By obtaining the relationship between the current change amount and a torque constant in advance and by storing the relationship in the memory unit 32, a torque constant can be estimated based on the measured current change amount. In the case where an LPF current is used in the same manner as the embodiment 1, influence of oscillation can be eliminated and hence, the use of the LPF current is more preferable.

In a case where Kt is estimated on a condition that values in the right term parenthesis in the equation (2) are set to a fixed value Tc1 (a torque for obtaining a required torque) based on this value, a motor stop current Icut is changed as expressed in the following equation corresponding to the estimated Kt.

[Equation 7]

$$I_{cut} = \frac{1}{K_T} T_{C1} \quad (7)$$

In this manner, a method where only a change in the torque constant Kt is corrected may be adopted. In the same manner, the viscous torque changes along with a temperature as illustrated in FIG. 16, and has a characteristic that the viscous torque is rapidly increased at a low temperature. In view of this characteristic, the equation (5) is modified to the following equation.

[Equation 8]

$$I_{cut} = \frac{1}{K_T}\left(KF_{CLP} + J\frac{d\omega(t)}{dt} + T_{fric}\right) + I_\lambda \quad (8)$$

In the above-mentioned equation (8), by setting values in the parenesis to a fixed value Ts (a torque from which a viscous component for obtaining a required pressing force is removed), the following equation (9) is obtained.

[Equation 9]

$$I_{cut} = \frac{1}{K_T} T_S + I_\lambda \quad (9)$$

Based on the relationship illustrated in FIG. 9 and the relationship illustrated in FIG. 16, the relationship between a viscous torque and a current change amount/voltage illustrated in FIG. 17 is obtained. In FIG. 9 and FIG. 16, a temperature is taken on an axis of abscissas. As can be understood from this relationship, a current change amount/voltage and a viscous torque become large in region where a temperature is low, and the current change amount/voltage and the viscous torque become small in a region where a temperature is high. In view of the above, in a region where the current change amount/voltage is low, the viscous torque becomes also low, while in a region where the current change amount/voltage, is high, the viscous torque becomes also high. Accordingly, the relationship between the viscous torque and the current change amount/voltage illustrated in FIG. 17 is obtained.

With such processing described above, a motor stop current can be obtained in a dividing manner based on a change in torque constant and a change in influence of viscosity. Accordingly, the processing is effective in a case where it is sufficient to eliminate influence of only one characteristic. Accordingly, a motor stop current can be obtained more simply.

In the abovementioned description, as the embodiment, the case has been described where the brake device of the present invention is applied to the disc brake. However, the brake device of the present invention is also applicable to a drum brake. Further, the brake device of the present invention is not limited to a vehicle such as an automobile, and can be used in any applications where it is necessary to generate a braking force.

The embodiments of the present invention have been described in detail heretofore, the present invention is not limited to the above-mentioned embodiments, and various design changes can be made without departing from the spirit of the present invention described in claims. For example, the above-described embodiments are described in detail for facilitating the understanding of the present invention and hence, the present invention is not necessarily limited to the brake device that includes all constituent elements described above.

Further, a part of one configuration of the embodiment may be replaced with the configuration of another embodiment, or the configuration of one embodiment may be added to the configuration of another embodiment. Further, with respect to a part, of the configuration of each embodiment, the addition, the deletion and the replacement of other configurations are conceivable.

LIST OF REFERENCE SIGNS

1: brake device
2: disc rotor (rotary member)
3: carrier
4: cylinder
5a, 5b: brake pad (pressing member)
6: piston
7: pressure chamber
8: electric motor
9: speed reduction device.
10: rotation/straight movement converting mechanism
11: brake control device (controller)
12: electric line
21: vehicle
22: brake pedal
23: master cylinder
24a, 24b, 24c: pipe
25a, 25b: front wheel disc brake device
27: liquid pressure, control device
31: current detection unit
32: memory unit
33: arithmetic operation unit
34: driver circuit
35: timer
36: power source
37: parking brake switch
38: ens or
39: CAN
40: notification unit
41: apply command
42: thrust
43: motor current
43a: APF current
44: motor stop current
45: idle running current
46: motor inter-terminal voltage

The invention claimed is:
1. An electric parking brake device comprising:
a rotary member;
a pressing member that is configured to be pressed to the rotary member;
an electric motor configured to impart a thrust to the pressing member;
a current detection unit configured to detect a motor current of the electric motor;
a voltage detection unit configured to detect a voltage of the electric motor; and
a brake control device configured to control the electric motor based on the motor current, wherein
the brake control device is configured to control the electric motor based on a current change amount of an electric current from a point of time that the motor current becomes a peak current to a predetermined point of time, and
calculate a motor stop current of the electric motor based on a value obtained by dividing the current change amount by the voltage of the electric motor.

2. The electric parking brake device according to claim 1, wherein the predetermined point of time is set before a point of time that an idle running current where the motor current becomes approximately constant is detected.

3. The electric parking brake device according to claim 1, wherein
the brake control device is further configured to stop the electric motor when the motor current has exceeded the motor stop current or when a predetermined time has elapsed after the motor current has exceeded the motor stop current.

4. An electric parking brake device comprising:
a rotary member;
a pressing member that is configured to be pressed to the rotary member;
an electric motor configured to impart a thrust to the pressing member;
a current detection unit configured to detect a motor current of the electric motor;
a voltage detection unit configured to detect a voltage of the electric motor; and
a brake control device configured to control the electric motor based on the motor current, wherein
the electric parking brake device further comprises a low pass filter (LPF) configured to eliminate noise of the motor current,
the brake control device is configured to control the electric motor based on an LPF current change amount during a predetermined period that comes after a point of time that an LPF current that has passed through the LPF has become a peak current and includes a point of time at which a gradient of the LPF current becomes maximum, and
the brake control device is configured to calculate a motor stop current of the electric motor based on a value obtained by dividing the LPF current change amount by the voltage of the electric motor.

5. The electric parking brake device according to claim 4, wherein the brake control device is further configured to stop the electric motor when the LPF current has exceeded the motor stop current or when a predetermined time has elapsed after the motor current has exceeded the motor stop current.

6. An electric parking brake control method configured to control an electric motor, the method comprising:
detecting a motor current of the electric motor that imparts a thrust to a brake pad;
detecting a voltage of the electric motor;
calculating a motor stop current of the electric motor; and
controlling the electric motor based on a current change amount of an electric current from a point of time that the motor current becomes a peak current to a predetermined point of time, and
wherein the motor stop current is calculated based on a value obtained by dividing the current change amount by the voltage of the electric motor.

7. The electric parking brake control method according to claim 6, wherein the predetermined point of time is set before a point of time that an idle running current where the motor current becomes approximately constant is detected.

8. An electric parking brake control method configured to control an electric motor, the method comprising:
- detecting a motor current of the electric motor that imparts a thrust to a brake pad;
- removing noise of the motor current via a low pass filter (LPF);
- detecting a voltage of the electric motor;
- calculating a motor stop current of the electric motor; and
- controlling the electric motor based on an LPF current change amount during a predetermined period that comes after a point of time that an LPF current that has passed through the LPF has become a peak current and includes a point of time at which a gradient of the LPF current becomes maximum, and
- wherein the motor stop current is calculated based on a value obtained by dividing the LPF current change amount by the voltage of the electric motor.

\* \* \* \* \*